United States Patent [19]
Dietrich et al.

[11] Patent Number: 5,552,798
[45] Date of Patent: Sep. 3, 1996

[54] ANTENNA FOR MULTIPATH SATELLITE COMMUNICATION LINKS

[75] Inventors: Frederick J. Dietrich, Palo Alto; Paul A. Monte, San Jose, both of Calif.

[73] Assignee: Globalstar L.P., San Jose, Calif.

[21] Appl. No.: 294,633

[22] Filed: Aug. 23, 1994

[51] Int. Cl.⁶ ............................................. H01Q 1/38
[52] U.S. Cl. .................. 343/893; 343/853; 343/700 MS; 343/DIG. 2
[58] Field of Search ........................ 343/DIG. 2, 700 MS, 343/754, 893, 853, 725; 342/352, 354; 29/600

[56] References Cited

U.S. PATENT DOCUMENTS

| | | | |
|---|---|---|---|
| 4,162,499 | 7/1979 | Jones, Jr. et al. | 343/700 MS |
| 4,605,932 | 8/1986 | Butscher et al. | 343/700 MS |
| 4,792,808 | 12/1988 | Hildebrand | 343/700 MS |
| 4,816,836 | 3/1989 | Lalezari | 343/700 MS |
| 4,901,307 | 2/1990 | Gilhousen et al. | 370/18 |
| 4,980,692 | 12/1990 | Rudish et al. | 343/700 MS |
| 5,233,626 | 8/1993 | Ames | 375/1 |
| 5,243,354 | 9/1993 | Stern et al. | 343/754 |
| 5,303,286 | 4/1994 | Wiedeman | 379/59 |

FOREIGN PATENT DOCUMENTS

| | | |
|---|---|---|
| 2363618 | 7/1975 | Germany . |
| 0012244 | 1/1979 | Japan .................... 343/DIG. 2 |
| 2243492 | 10/1991 | United Kingdom . |
| WO86/00760 | 1/1986 | WIPO . |

Primary Examiner—Donald T. Hajec
Assistant Examiner—Tan Ho
Attorney, Agent, or Firm—Perman & Green

[57] ABSTRACT

An antenna (70) includes a first sub-structure (72) having a major plane that is oriented at a first angle (for example, 90°) with respect to an axis (normal) that is perpendicular to the surface of the earth. The antenna also includes a plurality (for example six) of second sub-structures (74) individual ones of which have a local major plane that is disposed at a second angle (for example, 45°) to the major plane of the first sub-structure. Each of the plurality of sub-structures have an outwardly pointing normal from the local major plane that is oriented at a third angle (for example, 60°) around the axis from an outwardly pointing normal of an adjacent one of the sub-structures. The outwardly pointing normal of each of the plurality of sub-structures is disposed so as to point away from the axis. At least one antenna element (76) is supported by the first sub-structure and by each of the plurality of second sub-structures. Antenna elements of the first sub-structure and at least some of the plurality of second sub-structures enable a spread spectrum communication between a terminal (13) and at least one low earth orbit satellite (12) over a range of elevation angles of the low earth orbit satellite.

35 Claims, 11 Drawing Sheets

ANTENNA FOR MULTIPATH SATELLITE COMMUNICATION LINKS

FIELD OF THE INVENTION

This invention relates in general to multipath communication systems and, in particular, to an antenna system for use in a multipath satellite-based communication system.

BACKGROUND OF THE INVENTION

Satellite-based communications systems are well are represented in the prior art. By example, reference is made to U.S. Pat. No. 5,303,286, issued on Apr. 12, 1994 to Robert A. Wiedeman, and which is entitled "Wireless Telephone/Satellite Roaming System". Reference is also made to the numerous U.S. Patents, foreign patents, and other publications that are of record in U.S. Pat. No. 5,303,286.

Of particular interest to this invention is U.S. Pat. No. 5,233,626, issued Aug. 3, 1993 to Stephen A. Ames and entitled "Repeater Diversity Spread Spectrum Communication System". This patent teaches a repeater diversity spread spectrum communication system that provides substantially fade free communications between a transmitter (1) and a receiver (7). A transmitted signal is relayed through a plurality of linear communications repeaters (3–6) that produce copies of the transmitted signal, the copies each arriving through an independently fading signal path. The transmitter and/or the receiver may be mounted upon a mobile platform, and the plurality of repeaters may be terrestrial or may be provided in satellites in low earth orbit or in geosynchronous earth orbit. The receiver processes the received signal copies to equalize them to one another in delay, frequency, and phase, and then combines the multiple received and equalized signal copies to produce a composite signal having a greatly reduced fading depth.

SUMMARY OF THE INVENTION

This invention is directed to an antenna system for use in a multipath, satellite-based communication system that provides a ground station or terminal with a capability to transmit to and receive from a plurality of low earth orbit (LEO) satellites of a constellation of LEO communication satellites.

The antenna of this invention provides a high gain for a user terminal that includes both a receiver and a transmitter of LEO satellite signals. The additional receiver gain provided by the antenna enables a corresponding reduction in satellite (repeater) transmitter output power, which is a beneficial result when considering the limited power that a LEO satellite has available. This reduction in satellite power is made possible on both a forward link (gateway-to-user) and reverse link (user-to-gateway). The additional gain provided by the antenna also enables a corresponding reduction in user terminal transmitter output power.

An antenna includes a first sub-structure having a major plane that is oriented at a first angle (for example, 90°) with respect to an axis (normal) that is perpendicular to the surface of the earth. The antenna 70 also includes a plurality N (for example six) of second sub-structures 74 individual ones of which have a local major plane that is disposed at a second angle (for example, 45°) to the major plane of the first sub-structure. Each of the plurality of sub-structures has an outwardly pointing normal from the local major plane that is oriented at a third angle (for example, 60°) around the axis from an outwardly pointing normal of an adjacent one of the sub-structures. However, N and consequently the third angle may have different values, for example 8° and 45°. The outwardly pointing normal of each of the plurality of sub-structures is disposed so as to point away from the axis.

At least one antenna element, such as a horn or patch or an array of patches, is supported by the first sub-structure and also by each of the plurality of second sub-structures. Antenna elements of the first sub-structure and at least some of the plurality of second sub-structures enable a spread spectrum communication between a terminal and at least one low earth orbit satellite over a wide range of elevation angles of the low earth orbit satellite.

Selection of the antenna element(s) of a particular sub-structure for use is made on predicted satellite elevation angle and azimuth angle, based on satellite ephemeris data, or is made on measurements of received signal strength by scanning the antenna element(s) of a plurality of sub-structures in turn. Combinations of satellite ephemeris data predictions and measured signal strengths may also be used.

Also disclosed is a method for operating a terminal to receive a communication from or transmit a communication to at least one satellite of a plurality of low earth orbit satellites. Each of the plurality of satellites is oriented, at any given time when in view of the terminal, at a particular elevation angle. The method includes the steps of, for a first range of elevation angles, selecting a first portion of an antenna structure to receive or transmit the communication, the first portion being disposed at a first angle with respect to an axis that is normal to the surface of the earth. For a second range of elevation angles, the method selects a second portion of the antenna structure to receive or transmit the communication, the second portion being disposed at a second angle with respect to the axis that is normal to the surface of the earth. For a possible third and subsequent ranges of elevation angles, the method selects further portions of the antenna structure to receive or transmit the communication, the further portions being disposed at the first angle with respect to the axis that is normal to the surface of the earth.

The method further includes the simultaneously executed steps of receiving and tracking a synchronizing signal from at least one other satellite of the plurality of satellites.

In a preferred embodiment of this invention the received communication is a spread spectrum communication, and the steps of receiving and tracking include a step of locking to a pilot channel that is transmitted by the at least one other satellite.

BRIEF DESCRIPTION OF THE DRAWINGS

The above set forth and other features of the invention are made more apparent in the ensuing Detailed Description of the Invention when read in conjunction with the attached Drawings, wherein.

DETAILED DESCRIPTION OF THE INVENTION

Figure 1:
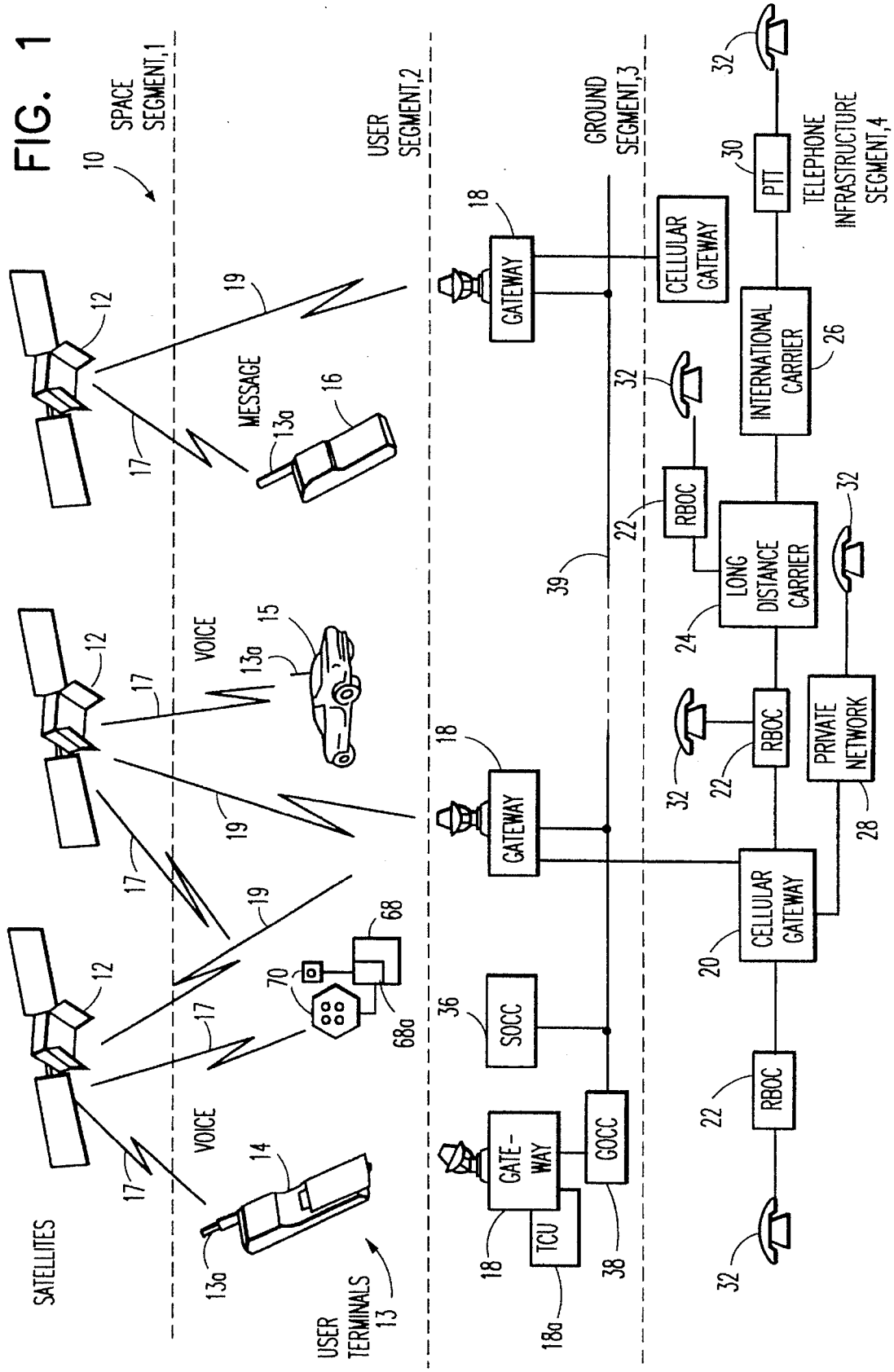
FIG. 1 is block diagram of a satellite communication system that is constructed and operated in accordance with a presently preferred embodiment of the antenna system of this invention.

FIG. 1 illustrates a presently preferred embodiment of a satellite communication system 10 that is useable with the presently preferred embodiment of an antenna system of this invention. Before describing this invention in detail, a description will first be made of the communication system 10 so that a more complete understanding may be had of the antenna system of this invention.

Figure 6:
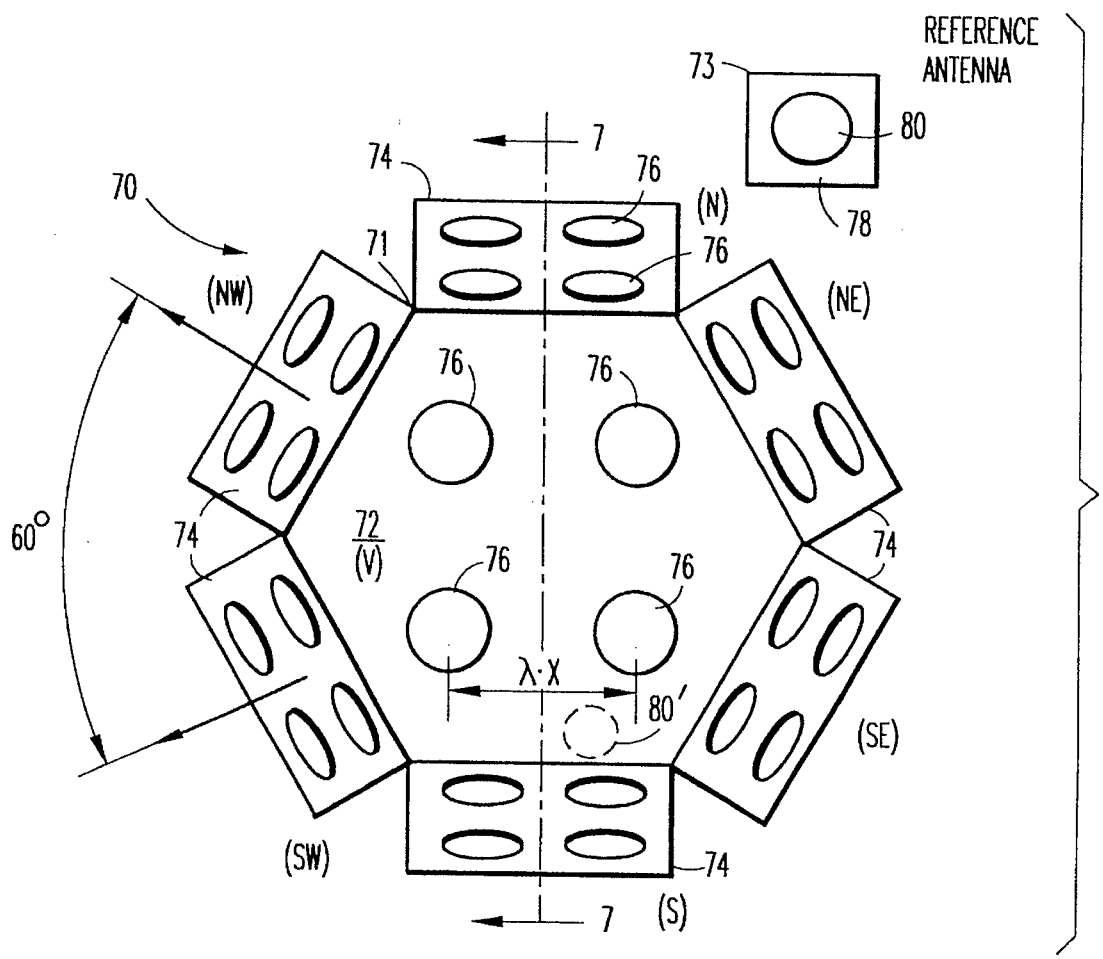
FIG. 6 is a top view of a presently preferred fixed antenna structure of this invention.
Figure 7:
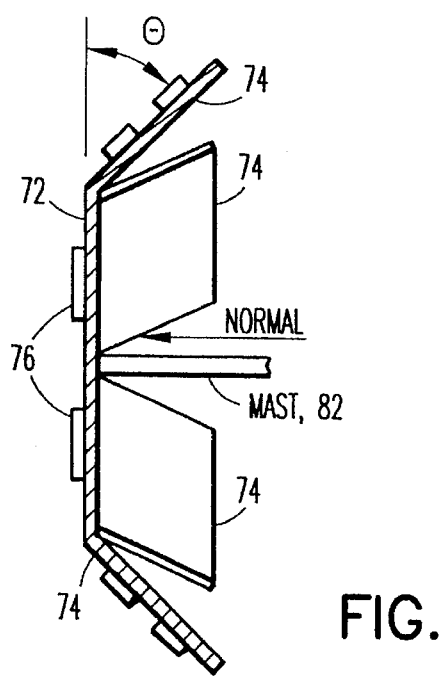
FIG. 7 is a cross-sectional view of the antenna structure of FIG. 6, taken along the section line 7—7.

The communications system 10 may be conceptually sub-divided into a plurality of segments 1, 2, 3 and 4. Segment 1 is referred to herein as a space segment, segment 2 as a user segment, segment 3 as a ground (terrestrial) segment, and segment 4 as a telephone system infrastructure segment. This invention is most specifically directed to the user segment 2, in particular, to a fixed antenna structure 70 as shown in FIGS. 6 and 7. The antenna structure 70, and the associated electronic system, enables simultaneous user communication with a plurality of individual ones of the satellites that form a constellation of low earth orbiting (LEO) satellites 12.

In the presently preferred embodiment of this invention there are a total of 48 satellites in, by example, 1410 km LEOs. The satellites 12 are distributed in eight orbital planes with six equally-spaced satellites per plane (Walker constellation). The orbital planes are inclined at 52 degrees with respect to the equator and each satellite completes an orbit once every 114 minutes. This approach provides approximately full-earth coverage with, preferably, at least two satellites in view at any given time from a particular user location between 70 degree south latitude and 70 degree north latitude. As such, a user is enabled to communicate from any point on the earth's surface to any other point on the earth's surface, via one or more gateways 18 and one or more of the satellites 12, possibly also using a portion of the telephone infrastructure segment 4.

It is noted at this point that the foregoing and ensuing description of the system 10 represents but one suitable embodiment of a communication system within which the antenna structure and system of this invention may find use. That is, the specific details of the communication system are not to be read or construed in a limiting sense upon the practice of this invention.

Continuing now with a description of the system 10, a soft transfer (handoff) process between satellites 12, and also between individual ones of 16 spot beams transmitted by each satellite (FIG. 3B), provides unbroken communications via a spread spectrum (SS), code division multiple access (CDMA) technique. The presently preferred SS-CDMA technique is generally compatible with the TIA/EIA Interim Standard, "Mobile Station-Base Station Compatibility Standard for Dual-Mode Wideband Spread Spectrum Cellular System" TIA/EIA/IS-95, July 1993.

The low earth orbits permit low-powered fixed or mobile user terminals 13 to communicate via the satellites 12, each of which functions, in a presently preferred embodiment of this invention, solely as a "bent pipe" repeater to receive a communications traffic signal (such as speech and/or data) from a user terminal 13 or from a gateway 18, convert the received communications traffic signal to another frequency band, and to then re-transmit the converted signal. That is, no on-board processing of a received communications traffic signal occurs, and the satellite 12 does not become aware of any intelligence that a received or transmitted communications traffic signal may be conveying.

Furthermore, there need be no direct communication link or links between the satellites 12. That is, each of the satellites 12 receives a signal only from a transmitter located in the user segment 2 or from a transmitter located in the ground segment 3, and transmits a signal only to a receiver located in the user segment 2 or to a receiver located in the ground segment 3.

The user segment 2 may include a plurality of types of user terminals 13 that are adapted for communication with the satellites 12. The user terminals 13 include, by example, a plurality of different types of fixed and mobile user terminals including, but not limited to, radio-telephones 14, mobile radio-telephones 15, and paging/messaging-type devices 16.

Of particular interest herein is a user terminal 68 having an antenna structure 70, and associated receiver electronics 68a, that is constructed and operated in accordance with this invention. As will be described in detail, the antenna structure 70 enables the simultaneous reception of signals from, and also the transmission of signals to, a plurality of the satellites 12, individual ones of which are, at any given time, most probably oriented at a different elevation angle relative to the antenna structure 70. This provides an ability to selectively track a satellite 12 that is transmitting the strongest signal and to follow the satellite as it passes overhead. Furthermore, an ability is provided to receive and lock-on to a non-communication traffic synchronizing signal (for example a pilot signal) that is transmitted by each satellite 12. This enables a rapid and smooth transition or handoff from one satellite 12 to another of the satellites 12, it being realized that each of the satellites may be transmitting an identical copy of a same SS-CDMA communication link, such as a voice communication, to the user terminal 68. This provides a diversity reception mode that mitigates the effects of fading and other signal-degradations. A transmission of a user communication from the user terminal 68 to a plurality of the satellites 12 is also made possible by the use of the antenna structure 70.

Figure 3A:
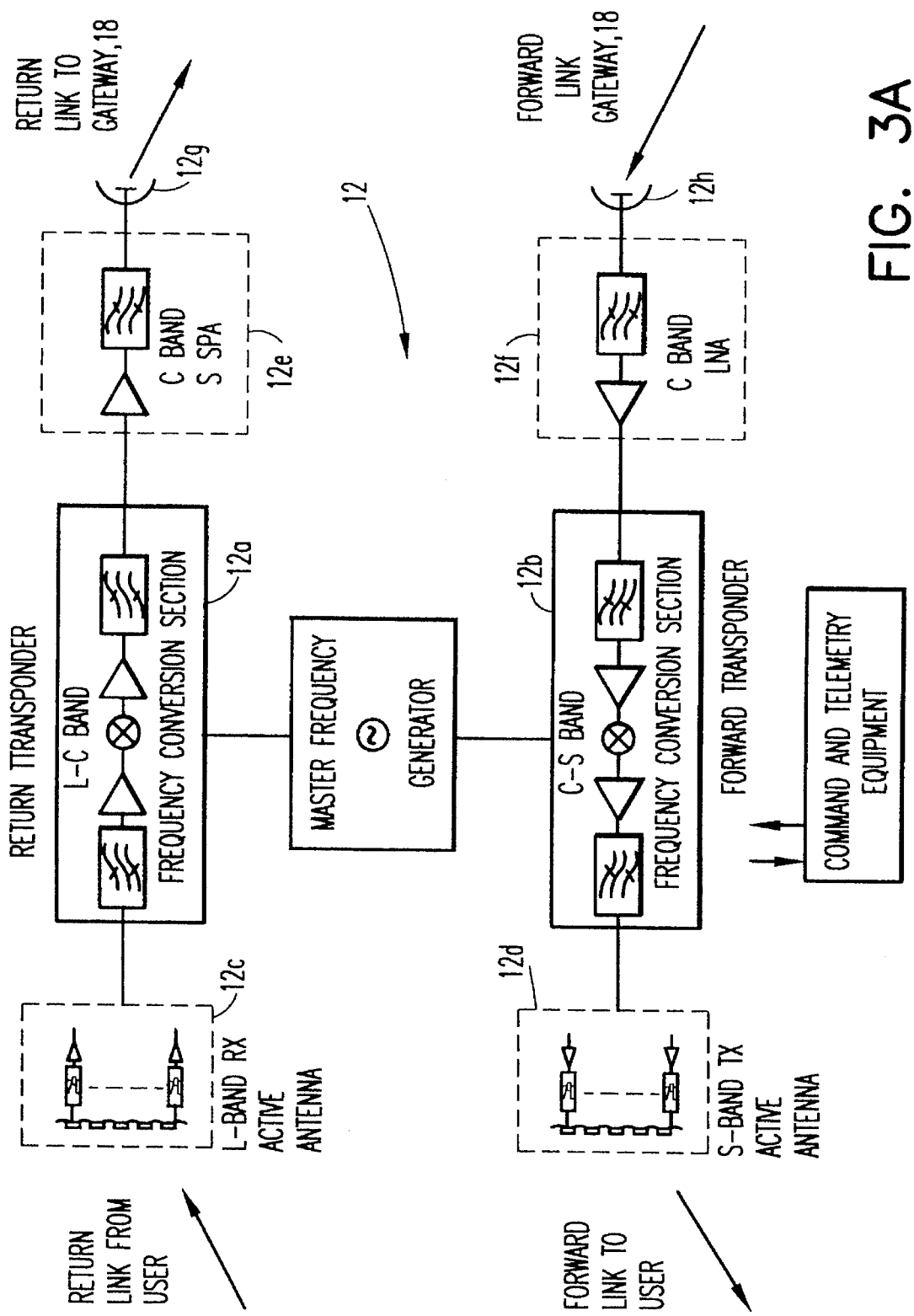
FIG. 3A is a block diagram of the communications payload of one of the satellites of FIG. 1.
Figure 3B:
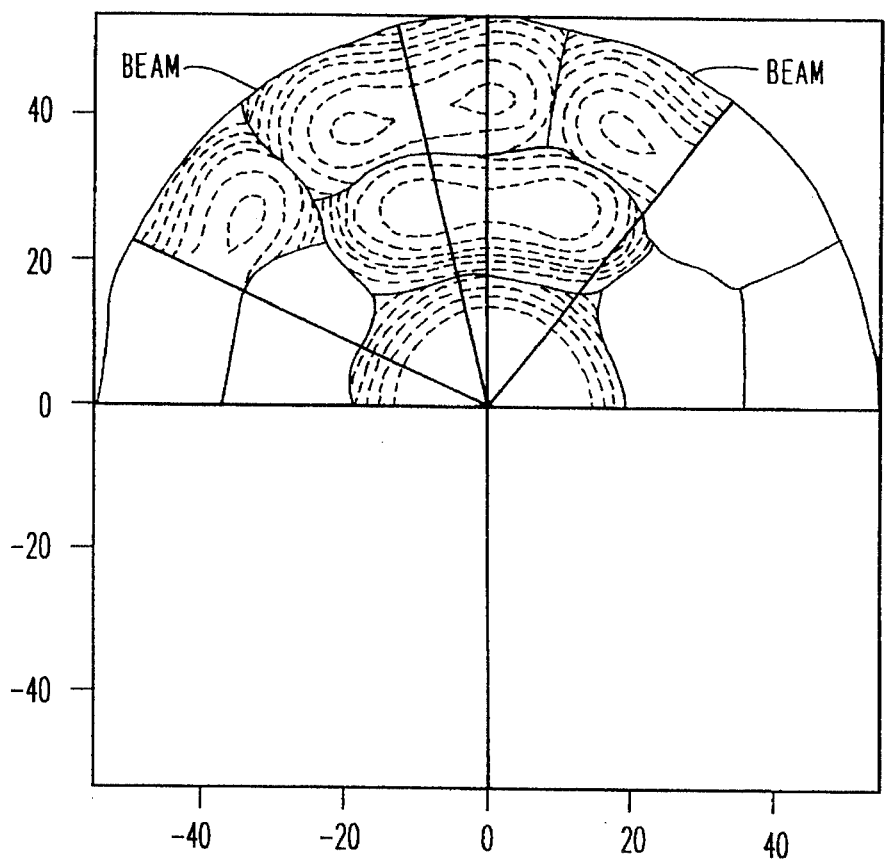
FIG. 3B illustrates a portion of the beam pattern that is transmitted from one of the satellites of FIG. 1.

Referring also to FIG. 3A, the user terminals 13 may be capable of operating in a full duplex mode and communicate via, by example, L-band RF links (uplink) and S-band RF links (downlink) through return and forward satellite transponders 12a and 12b, respectively. Uplink L-band RF links may operate within a frequency range of 1.61 GHz to 1.6265 GHz, bandwidth 16.5 MHz, and are modulated with voice signals and/or digital signals in accordance with the preferred spread spectrum technique. Downlink S-band RF links may operate within a frequency range of 2.485 GHz to 2.5 GHz, bandwidth 16.5 MHz. The downlink RF links 17 are also modulated at a gateway 18 with voice signals and/or digital signals in accordance with the spread spectrum technique.

The ground segment 3 includes a plurality of the gateways 18 that communicate with the satellites 12 via a, by example, full duplex C-band RF link 19 that may operate within a range of frequencies centered on 5 GHz. The C-band RF links bi-directionally convey the communication feeder links, and also convey satellite commands (forward link) and receive telemetry information (return link).

The satellite feeder link antennas 12g and 12h are earth coverage antennas, while the L-band and the S-band antennas are multiple beam (preferably 16 beam) antennas that provide earth coverage within an associated service region. The L-band and S-band antennas 12g and 12h are congruent with one another. As an example, a total of approximately 3000 full duplex communications may occur through a given one of the satellites 12. In accordance with a feature of the system 10, two or more satellites 12 may each convey the same communication between a given user terminal 13 and one of the gateways 18. This mode of operation, as described in detail below, thus provides for diversity combining at the respective receivers, leading to an increased resistance to fading and facilitating the implementation of a soft handoff procedure.

It is pointed out that all of the frequencies, bandwidths and the like that are described herein are representative of but one particular system. Other frequencies and bands of frequencies may be used with no change in the principles being discussed. As but one example, the feeder links between the gateways and the satellites may use frequencies in a band other than the C-band, for example the Ku or Ka bands.

The gateways 18 function to couple the communications payload (transponders 12a, 12b, L-band receive antenna 12c, S-band transmit antenna 12d, C-band power amplifier 12e, C-band low noise amplifier 12f, and C-band antennas 12g and 12h) of the satellites 12 to the telephone infrastructure segment 4.

The telephone infrastructure segment 4 is comprised of existing telephone systems and includes cellular gateways 20, Regional Bell Operating Centers (RBOC) 22 or other local telephone service providers, long distance carriers 24, international carriers 26, private networks 28 and public telephone and telegraph systems 30. The communication system 10 operates to provide communication between the user segment 2 and the telephones 32 of the telephone infrastructure segment 4, and also operates to enable communication between individual ones of the user devices of the user segment 2, via the gateways 18.

Also shown in FIG. 1 (and also in FIG. 4), as a portion of the ground segment 3, is a Satellite Operations Control Center (SOCC) 36, and a Ground Operations Control Center (GOCC) 38. A communication path 39, which includes a Ground Data Network (GDN) 58 (see FIG. 2), is provided for interconnecting the gateways 18 and TCUs 18a, SOCC 36 and GOCC 38 of the ground segment 3. This portion of the communications system 10 provides overall satellite control functions.

Figure 2:
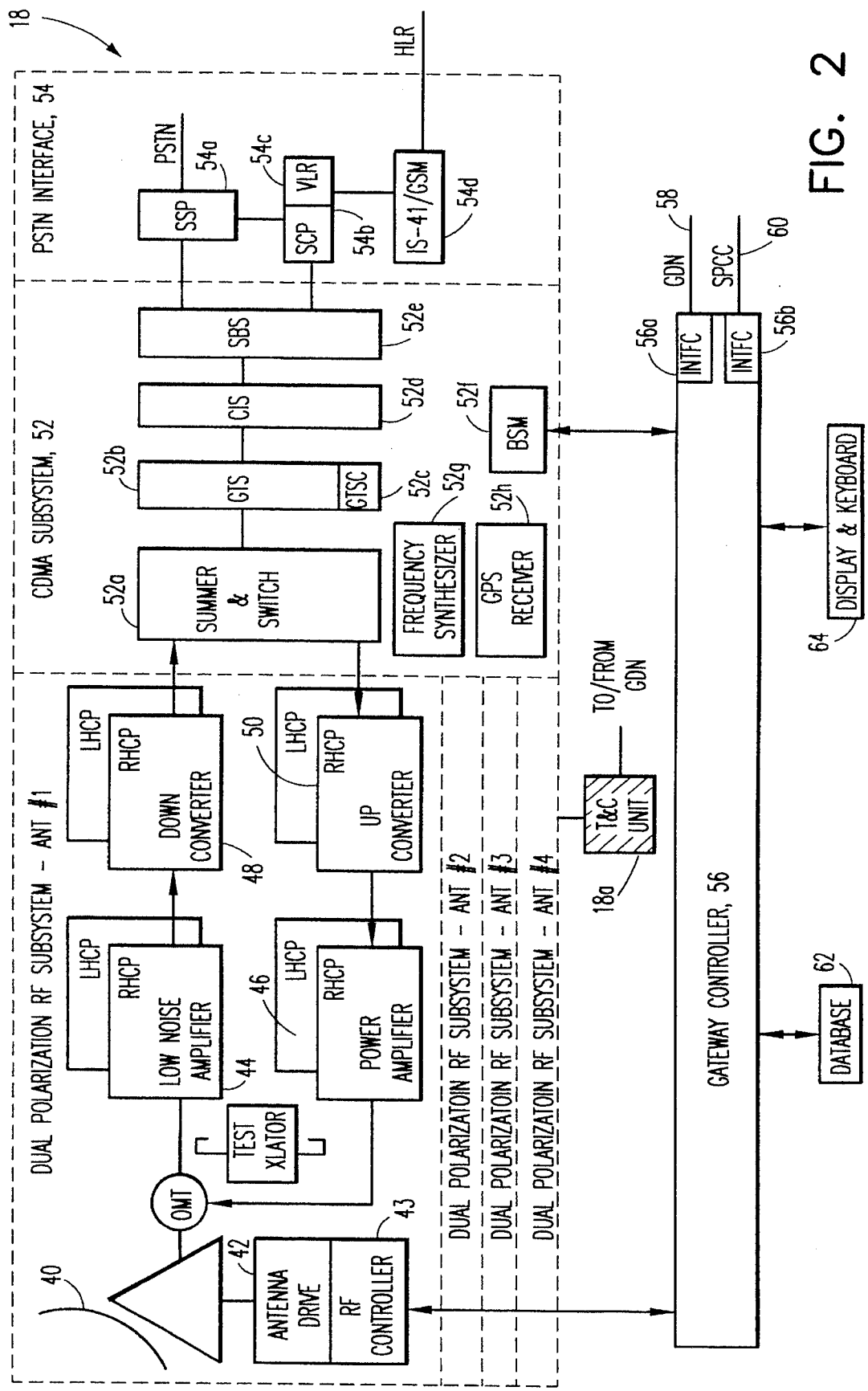
FIG. 2 is a block diagram of one of the gateways of FIG. 1.

FIG. 2 shows one of the gateways 18 in greater detail. Each gateway 18 includes up to four dual polarization RF C-band sub-systems each comprising a dish antenna 40, antenna driver 42, low noise receivers 44, and high power amplifiers 46. All of these components may be located within a radome structure to provide environmental isolation.

The gateway 18 further includes down converters 48 and up converters 50 for processing the received and transmitted RF carrier signals, respectively. The down converters 48 and the up converters 50 are connected to a CDMA sub-system 52 which, in turn, is coupled to the Public Switched Telephone Network (PSTN) though a PSTN interface 54.

The CDMA sub-system 52 includes a signal summer/switch unit 52a, a Gateway Transceiver Subsystem (GTS) 52b, a GTS Controller 52c, a CDMA Interconnect Subsystem (CIS) 54d, and a Selection Bank Subsystem (SBS) 54e. The CDMA sub-system 52 is controlled by a Base Station Manager (BSM) 52f and functions in a manner analogous to a CDMA-compatible (for example, an IS-95 compatible) base station. The CDMA sub-system 52 also includes the required frequency synthesizer 52g and a Global Positioning System (GPS) receiver 52h.

The PSTN interface 54 includes a PSTN Service Switch Point (SSP) 54a, a Service Control Point (SCP) 54b, a Visitor Location Register (VLR) 54c, and an interface 54d to a Home Location Register (HLR).

The gateway 18 is connected to telecommunication networks through a standard interface made through the SSP 54a. The gateway 18 provides an interface, and connects to the PSTN via Primary Rate Interface (PRI). The gateway 18 is further capable of providing a direct connection to a Mobile Switching Center (MSC).

The gateway 18 provides SS-7 ISDN fixed signalling to the SCP 54b. On the gateway-side of this interface, the SCP 54b interfaces with the Base Station Controller (BSC) and hence to the CDMA sub-system 52. The SCP 54b provides protocol translation functions for the Globalstar Air Interface (GAI), which may be based on a modified version of the IS-95 Interim Standard for CDMA communications.

Blocks 54c and 54d generally provide an interface between the gateway 18 and an external cellular telephone network that is compatible, for example, with the IS-41 (North American Standard, AMPS) or the GSM (European Standard, MAP) cellular systems and, in particular, to the specified methods for handling roamers, that is, users who place calls outside of their home system. The gateway 18 supports user terminal authentication for Satellite System/AMPS phones and for Satellite System/GSM phones. In service areas where there is no existing telecommunications infrastructure, an HLR can be added to the gateway 18 and interfaced with the SS-7 signalling interface.

A user making a call out of the user's normal service area (a roamer) is accommodated by the system 10 if authorized. In that a roamer may be found in any environment, a user may employ the same terminal equipment to make a call from anywhere in the world, and the necessary protocol conversions are made transparently by the gateway 18. The protocol converter 54d is bypassed when not required.

Overall gateway control is provided by the gateway controller 56 which includes an interface 56a to the above-mentioned Ground Data Network (GDN) 58 and an interface 56b to a Service Provider Control Center (SPCC) 60. The gateway controller 56 is generally interconnected to the gateway 18 through the BSM 52f and through RF controllers 43 associated with each of the antennas 40. The gateway controller 56 is further coupled to a database 62, such as a database of users, satellite ephemeris data, etc., and to an I/O unit 64 that enables service personnel to gain access to the gateway controller 56. The GDN 58 is also bidirectionally interfaced to a Telemetry and Command (T&C) unit 66 which provides an interface to the TCU sub-system 18a (FIGS. 1 and 4).

Figure 4:
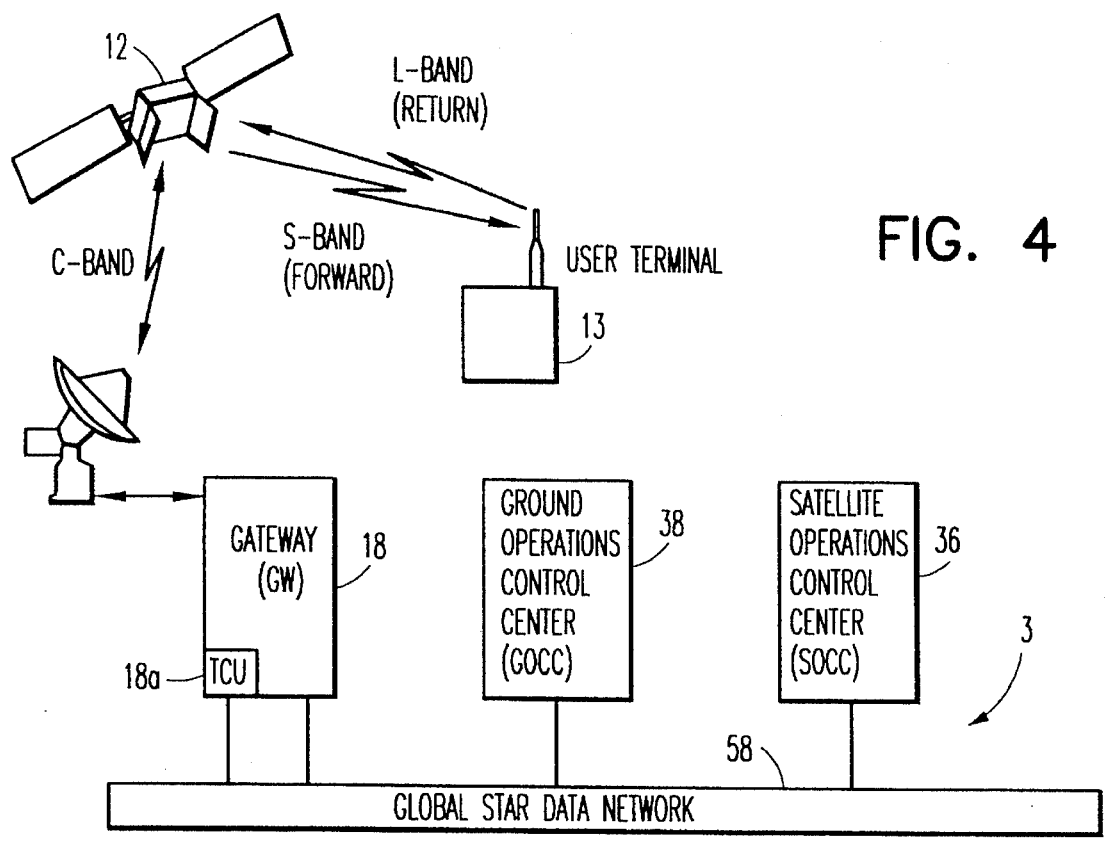
FIG. 4 is a block diagram that depicts the ground equipment support of satellite telemetry and control functions.

Referring to FIG. 4, the function of the GOCC 38 is to plan and control satellite utilization by the gateways 18, and to coordinate this utilization with the SOCC 36. In general, the GOCC 38 generates traffic plans, allocates both satellite 12 and gateway 18 resources, and monitors the performance of the overall system 10. The SOCC 36 operates to provide and monitor orbits, to monitor the overall functioning of each satellite 12, including the state of the satellite batteries, to set the gain for the RF signal paths within the satellite 12, and to ensure optimum satellite orientation with respect to the surface of the earth.

As described above, each gateway 18 functions to connect a given user to the PSTN for both signalling, voice and/or data communications and also to generate data, via database 62 (FIG. 2), for billing purposes. Selected gateways 18 include a Telemetry and Command Unit (TCU) 18a for receiving telemetry data that is transmitted by the satellites 12 over the C-band return link and for transmitting commands up to the satellites 12. The GDN 58 operates to interconnect the gateways 18, GOCC 38 and the SOCC 36.

In general, each satellite 12 of the LEO constellation operates to relay information from the gateways 18 to the users (C-band uplink to S-band downlink), and to relay information from the users to the gateways 18 (L-band uplink to C-band downlink). This information includes SS-CDMA pilot, synchronization, and paging channels, in addition to power control signals. Satellite ephemeris update data is also downloaded to each of the user terminals 13 via the satellites 12. The satellites 12 also function to relay signalling information from the user terminals 13 to the gateway 18, including access requests, power change requests, and registration requests. The satellites 12 also relay communication signals between the users and the gateways 18, and may apply security to mitigate unauthorized use.

In operation, the satellites 12 transmit spacecraft telemetry data that includes measurements of satellite operational status. The telemetry stream from the satellites, the commands from the SOCC 36, and the communications feeder links all share the C-band antennas 12g and 12h. For those gateways 18 that include a TCU 18a the received satellite telemetry data may be forwarded immediately to the SOCC 36, or the telemetry data may be stored and subsequently forwarded to the SOCC 36 at a later time, typically upon SOCC request. The telemetry data, whether transmitted immediately or stored and subsequently forwarded, is sent over the GDN 58 as packet messages, each packet message containing a single minor telemetry frame. Should more than one SOCC 36 be providing satellite support, the telemetry data is routed to all of the SOCCs.

The SOCC 36 has three primary interface functions with the GOCC 38. A first interface function is orbit position information, wherein the SOCC 36 provides orbital information to the GOCC 38 such that each gateway 18 can accurately track up to four satellites that may be in view of the gateway. This data includes data tables that are sufficient to allow the gateways 18 to propagate their own satellite contact lists, using known algorithms. These gateway-generated contact lists are also sent back to the SOCC 36 to support the gathering of telemetry information and the propagation of commands.

A second interface function is the provision of utilization statistics from the GOCC 38 to the SOCC 36. The utilization statistics pertain to the actual communications quality and utilization (gateway assessment) of each satellite 12. This information is correlated with satellite telemetry data to distinguish between expected and anomalous behavior, etc.

A third interface function is the provision of satellite status that is reported from the SOCC 36 to the GOCC 38. The satellite status information includes both satellite/transponder availability, battery status and orbital information and incorporates, in general, any satellite-related limitations that would preclude the use of all or a portion of a satellite 12 for communications purposes.

An important aspect of the system 10 is the use of SS-CDMA in conjunction with diversity combining at the gateway receivers and at the user-terminal receivers. Diversity combining is employed to mitigate the effects of fading as signals arrive at the user-terminals 13 or the gateway 18 from multiple satellites over multiple and different path lengths. Rake receivers are employed to receive and combine the signals from multiple sources. As an example, a user terminal 13 or the gateway 18 provides diversity combining for the forward link signals or the return link signals received from and transmitted through three satellites 12 simultaneously.

In this regard the disclosure of U.S. Pat. No. 5,233,626, issued Aug. 3, 1993 to Stephen A. Ames and entitled "Repeater Diversity Spread Spectrum Communication System", is incorporated by reference herein in its' entirety, as is the disclosure of U.S patent application Ser. No. 08/239, 750, filed May 9, 1994, by Robert Wiedeman and Paul A. Monte, entitled "Multipath Communications System Optimizer".

The performance in the continuous diversity reception mode is superior to that of receiving one signal through one satellite repeater, and furthermore there is no break in communications should one link be lost due to interference from trees or other obstructions that have an adverse impact on the received signal.

The multiple directional antennas 40 of a given one of the gateways 18 are capable of transmitting the forward link signal (gateway to user terminal) through different satellites 12 to support diversity combining in the user terminals 13. The omnidirectional antennas 13a of the user terminals 13 transmit through all satellites that can be "seen" from the user terminal 13.

Each gateway 18 supports a transmitter power control function to address slow fades, and also supports block interleaving to address medium to fast fades. Power control is implemented on both the forward and reverse links. The response time of the power control function is adjusted to accommodate for the average 30 msec satellite round trip delay.

The block interleavers (53d, 53e, 53f, FIG. 5) operate over a block length that is related to vocoder 53g packet frames. An optimum interleaver length trades off a longer length, and hence improved error correction, at the expense of increasing the overall end-to-end delay. A preferred maximum end-to-end delay is 150 msec or less. This delay includes all delays due to the received signal alignment performed by the diversity combiners, vocoder 53g processing delays, block interleaver 53d–53f delays, and the delays of the Viterbi decoders (not shown) that form a portion of the CDMA sub-system 52.

Figure 5:
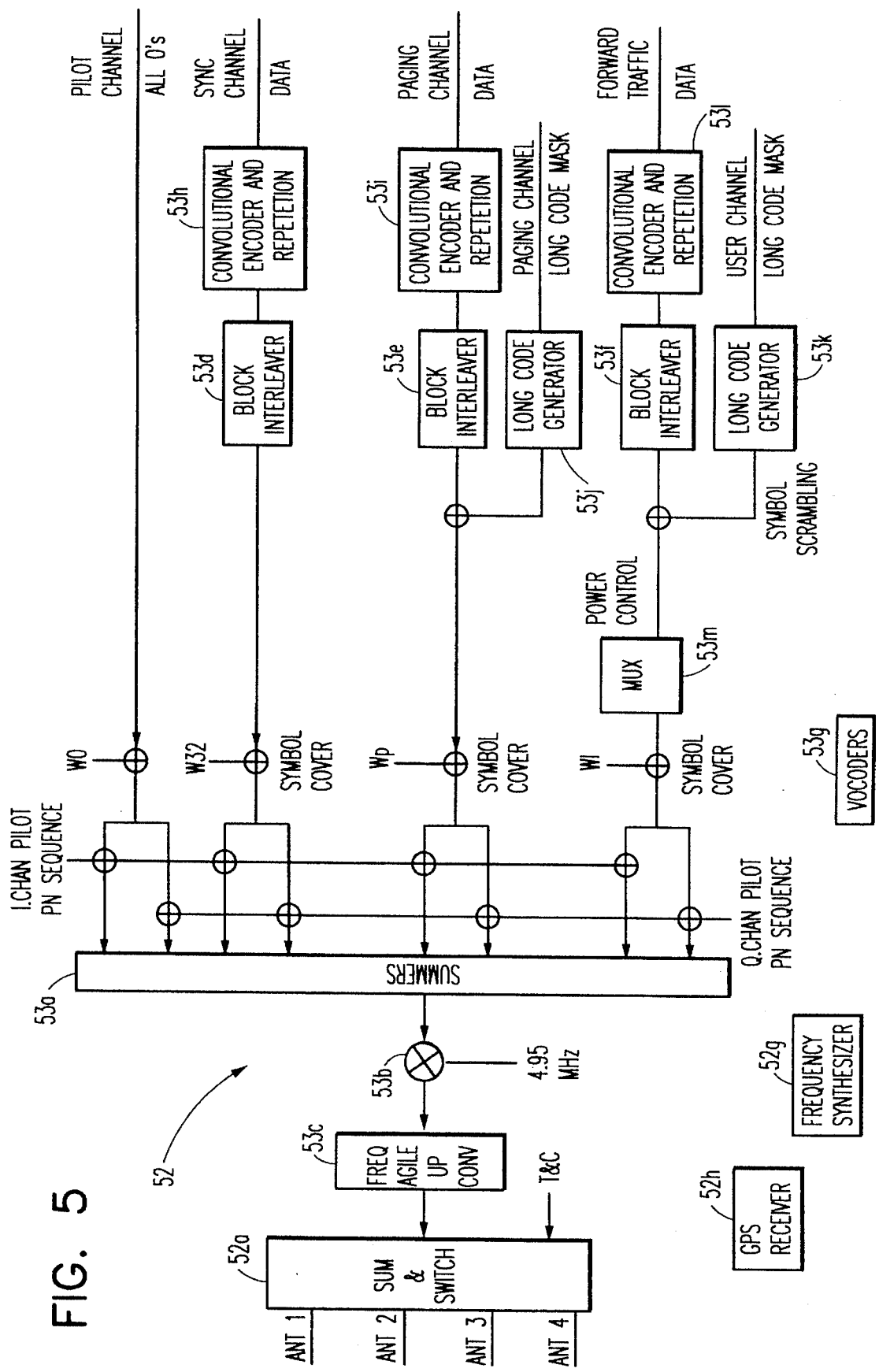
FIG. 5 is block diagram of the CDMA sub-system of FIG. 2.

FIG. 5 is a block diagram of the forward link modulation portion of the CDMA sub-system 52 of FIG. 2. An output of a summer block 53a feeds a frequency agile up-converter 53b which in turn feeds the summer and switch block 52a. The telemetry and control (T&C) information is also input to the block 52a.

An unmodulated direct sequence SS pilot channel generates an all zeros Walsh Code at a desired bit rate. This data stream is combined with a short PN code that is used to separate signals from different gateways 18 and different satellites 12. The pilot channel is modulo 2 added to the short code and is then QPSK spread across the CDMA bandwidth. The following different pseudonoise (PN) code offsets are provided: (a) a PN code offset to allow a user terminal 13 to uniquely identify a gateway 18; (b) a PN code offset to allow the user terminal 13 to uniquely identify a satellite 12; and (c) a PN code offset to allow the user terminal 13 to uniquely identify a given one of the 16 beams that is transmitted from the satellite 12. Pilot PN codes from different ones of the satellites 12 are assigned different time/phase offsets from the same pilot seed PN code.

Each pilot channel that is transmitted by the gateway 18 may be transmitted at a higher power level than the other signals. A pilot channel enables a user terminal 13 to acquire the timing of the forward CDMA channel, provides a phase reference for coherent demodulation, and provides a mechanism to perform signal strength comparisons to determine when to initiate handoff. The use of the pilot channel is not, however, mandatory, and other techniques can be employed for this purpose.

The Sync channel generates a data stream that includes the following information: (a) time of day; (b) transmitting gateway identification; (c) satellite ephemeris; and (d) assigned paging channel. The Sync data is applied to a convolution encoder 53h where the data is convolutionally encoded and subsequently block interleaved to combat fast fades. The resulting data stream is modulo two added to the synchronous Walsh code and QPSK spread across the CDMA bandwidth.

The Paging channel is applied to a convolutional encoder 53i where it is convolutionally encoded and is then block interleaved. The resulting data stream is combined with the output of a long code generator 53j. The long PN code is used to separate different user terminal 13 bands. The paging channel and the long code are modulo two added and provided to a symbol cover where the resulting signal is modulo two added to the Walsh Code. The result is then QPSK spread across the CDMA bandwidth.

In general, the paging channel conveys the following message types: (a) a system parameter message; (b) an access parameter message; (c) a neighborhood list message; and (d) a CDMA channel list message.

The system parameter message includes the configuration of the paging channel, registration parameters, and parameters to aid in pilot acquisition. The access parameters message includes the configuration of the access channel and the access channel data rate. The neighborhood list message includes neighborhood pilot identifiers and the neighborhood PN offsets. The CDMA channel list message conveys the associated pilot identification and the Walsh code assignment.

The vocoder 53k encodes the voice into a PCM forward traffic data stream. The forward traffic data stream is applied to a convolutional encoder 53l where it is convolutionally encoded and then block interleaved (in block 53f). The resulting data stream is combined with the output of a user long code block 53k. The user long code is employed to separate different subscriber channels. The resulting data stream is then power controlled in multiplexer (MUX) 53m, modulo two added to the Walsh code, and then QPSK Spread across the CDMA communication channel bandwidth.

With respect to return link demodulation; the gateway 18 operates to demodulate the CDMA return link(s). There are two different codes for the return link: (a) the zero offset pilot code; and (b) the long code. These are used by the two different types of return link CDMA Channels, namely the access channel and the return traffic channel.

For the access channel the gateway 18 receives and decodes a burst on the access channel that requests access. The access channel message is embodied in a long preamble followed by a relatively small amount of data. The preamble is the user terminal's long PN code. Each user terminal 13 has a unique long PN code generated by a unique time offset into the common PN generator polynomial. After receiving the access request, the gateway 18 sends a message on the forward link paging channel (blocks 53e, 53i, 53j) acknowledging receipt of the access request and assigning a Walsh code channel to establish a traffic channel. The gateway 18 also assigns a channel element and both the user terminal 13 and the gateway 18 switch to the assigned channel element and begin duplex communications.

The return traffic channel is generated in the user terminal 13 by convolutionally encoding the digital data from the local data source or the user terminal vocoder. The data is then block interleaved at predetermined intervals and is applied to a 128-Ary modulator and a data burst randomizer to reduce clashing. The data is then added to the zero offset PN code and transmitted through one or more of the satellites 12 to the gateway 18.

The gateway 18 processes the return link using a, by example, Fast Hadamard Transform (FHT) to demodulate the 128-Ary Walsh Code and provide the demodulated information to the diversity combiner.

The foregoing has been a description of a presently preferred embodiment of the communication system 10. A description is now made of presently preferred embodiments of the antenna structure 70 and the associated electronics for receiving and transmitting communication signals between the user terminal 68 (FIG. 1) and one or more of the satellites 12.

An important aspect of the antenna structure 70 is that it enables simultaneous communication with two or more of the satellites 12. This is facilitated by providing the user terminal 68 with the multi-finger spread spectrum receiver 68a. Such a multi-finger SS receiver is known in the art as a Rake receiver. One suitable receiver type is disclosed generally in FIGS. 2 and 4 of the aforementioned U.S. Pat. No. 5,233,626 to Ames. The use of this type of receiver enables a simultaneous reception of spread spectrum signals from two or more sources, and the digital combination of these signals in a diversity reception mode. The receiver 68a operates to equalize the various input signals for differences in Doppler frequency offsets due to satellite motion, differences in propagation delays, and differences in phase shift.

The identification of the source of each of the simultaneously received signals is made possible by the use of the different PN offsets for each of the satellite transmitters, as was described previously. This provides an improved signal to noise and interference ratio over the reception of but a single signal.

Reference is made to FIGS. 6 and 7 for showing one presently preferred embodiment of the antenna structure 70. The antenna structure 70 includes a high gain antenna 71 and a reference antenna 73. The high gain antenna 71 is comprised of seven separate antenna sub-structures designated as 72 for a vertically (V) oriented antenna sub-structure, and a plurality (6) of antenna sub-structures 74 that are disposed at a predetermined angle θ with respect to the vertical antenna sub-structure 72. The sub-structures 74, when the antenna structure 70 is installed, are oriented so as to face the north (N), northeast (NE), southeast (SE), south (S), southwest (SW) and northwest (NW) directions. Each of the antenna sub-structures 72 and 74 is comprised of one or more antenna elements 76. The antenna elements 76 may be horn antennas or any other suitable form of moderate-gain antenna, such as a patch or an array of patches, as shown in FIG. 6. In the illustrated embodiment each of the antenna sub-structures 72 and 74 includes four antenna elements 76 that are interconnected. A center-to-center spacing between individual elements is preferably some multiple of the wavelength(s) of interest, for example the center-to-center spacing is in a range of approximately 0.5 to approximately 0.8 times the wavelength λ. In general, the wider the spacing the higher is the gain. However, an increased spacing also increases the amplitude of grating lobes. By example, the overall width of the antenna sub-structure 72 may be 0.5 meters, the spacing between antenna elements is 10.6 cm (0.8 λ), and each element 76 has a diameter of approximately 5 centimeters. The high gain antenna 71 is preferably mounted to a mast 82 such that a top surface of the antenna sub-structure 72 is perpendicular to a normal to the surface of the earth. The reference antenna 73 includes, by example, a single antenna element 80 that is also oriented perpendicular to the normal to the earth's surface.

The angle θ is preferably within the range of approximately 30° to 60°, with the selected angle being a function of beam shape. The angle is also selected to provide as high a gain as is possible for a satellite oriented from approximately 10° elevation to 90° elevation (zenith). The use of 45° has been found to provide satisfactory results, as will be described below in reference to FIG. 10.

Figure 12:
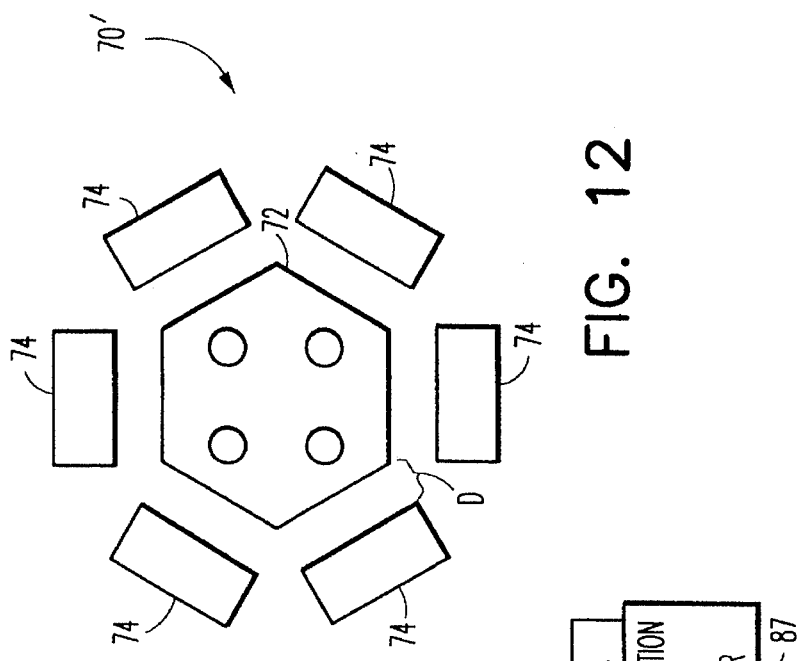
FIG. 12 is a top view of a further embodiment of the antenna structure of FIG. 6.

It should be realized that there is no requirement that the sub-structures 74 abut or be adjacent to the sub-structure 72. By example, and referring to FIG. 12, one or more of the sub-structures 74 may be spaced away by an arbitrary distance D from the edges of the sub-structure 72, so long as the above-described angular relationships between the various sub-structures are maintained.

Figure 14B:
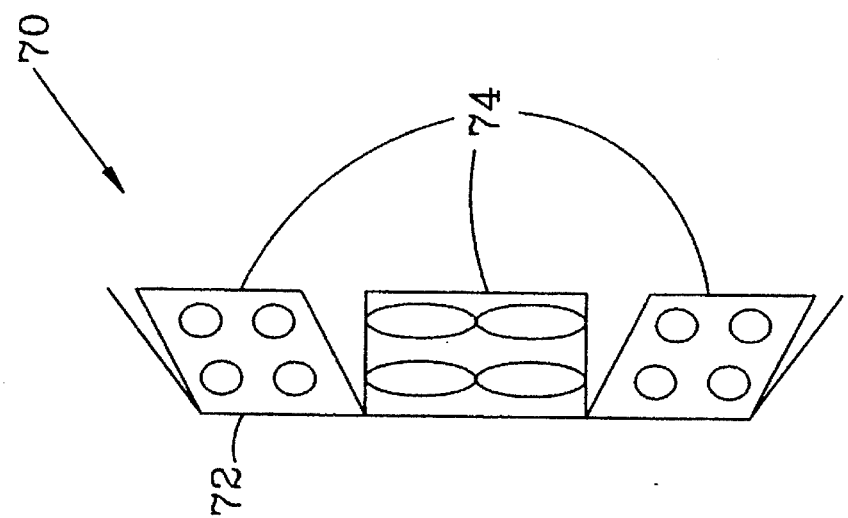
FIG. 14A is a top view and FIG. 14B is a side view of a further embodiment of the antenna structure of this invention.
Figure 14A:
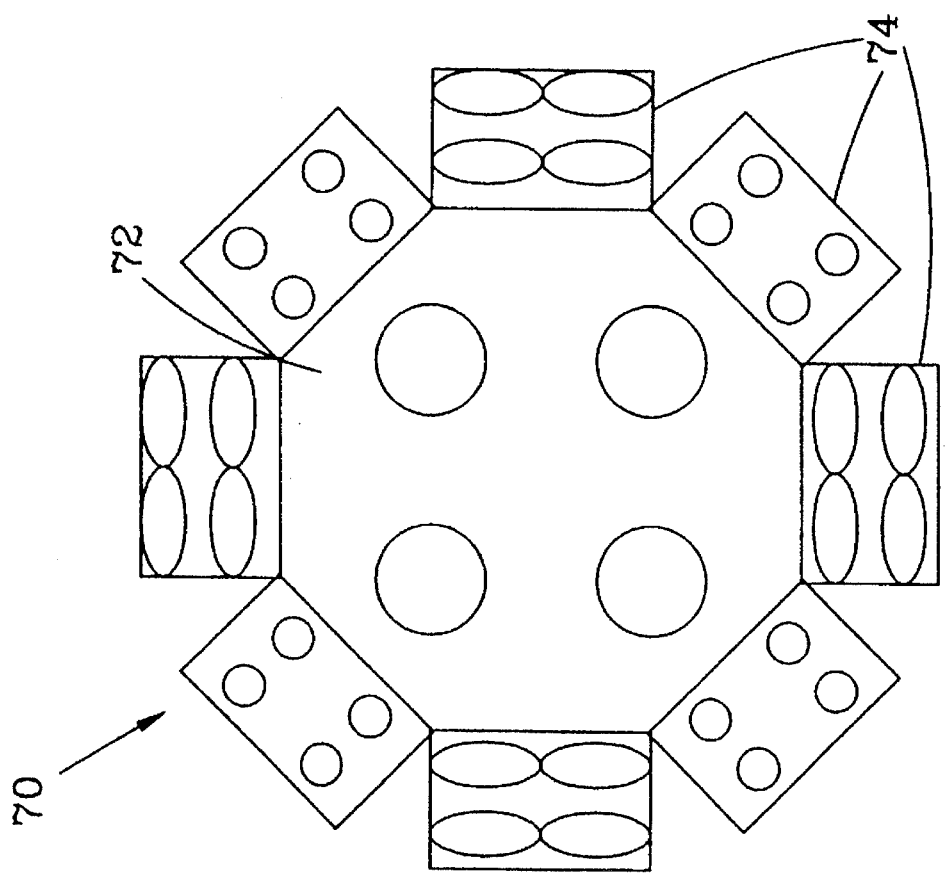

In view of the foregoing it can be seen that an aspect of this invention is the provision of an antenna that includes a first sub-structure 72 that has a major plane that is oriented at a first angle (for example, 90°) with respect to an axis (normal) that is perpendicular to the surface of the earth. The antenna 70 also includes a plurality N (for example six) of second sub-structures 74 individual ones of which have a local major plane that is disposed at a second angle (for example, 45°) to the major plane of the first sub-structure. Each of the plurality of sub-structures 74 has an outwardly pointing normal from the local major plane that is oriented at a third angle (for example, 60°) around the axis from an outwardly pointing normal of an adjacent one of the sub-structures 74. Further by example, N and consequently the third angle may have different values, for example 8° and 45°, respectively, as is shown in FIGS. 14A and 14B. The outwardly pointing normal of each of the plurality of sub-structures 74 is disposed so as to point away from the axis.

In a presently preferred embodiment of the invention the sub-structures 72, 74, and also the support 78 for the reference antenna element 80, are constructed from a copper-plated fiberglass or other suitable dielectric material.

Figure 11:
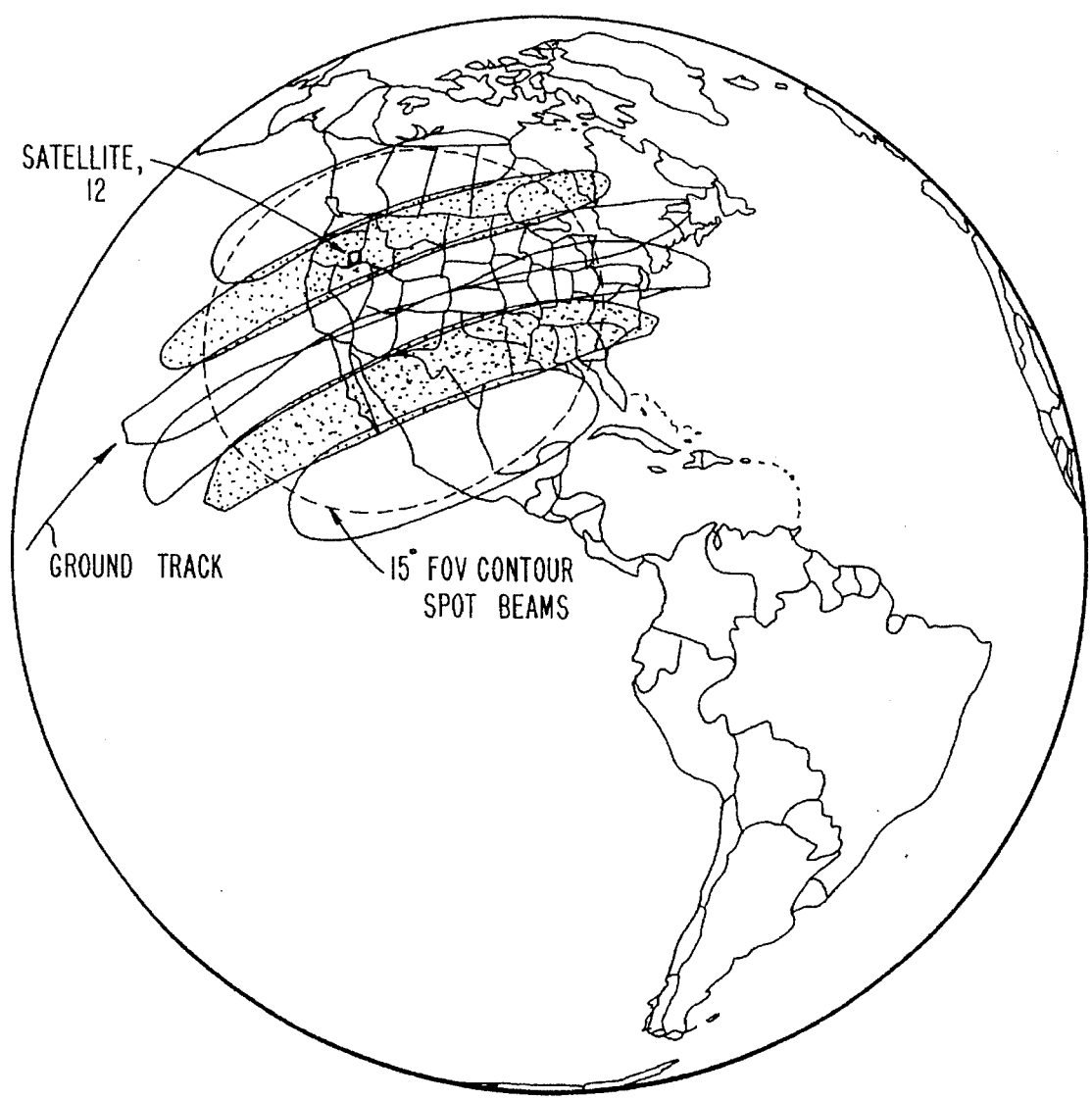
FIG. 11 illustrates an exemplary satellite track which is useful in explaining the orientation of the antenna sub-structures 74 of FIG. 6.

In the illustrated embodiment the antenna sub-structure 72 has a hexagonal shape and is pointed vertically. The six sub-structures 74 are arranged about the edges of the vertical sub-structure 72 in 60° segments in azimuth, and are slanted at the angle θ to position the peaks of their beams at the 45° elevation angle. The exact number of the angled sub-structures 74 is a trade-off between increased coverage and complexity/cost. The use of six of the sub-structures 74, facing in the indicated directions, has been found to provide satisfactory results with the orbits of the satellites 12, as indicated generally in FIG. 11. In FIG. 11 the groundtrack of one satellite 12 is shown, as are the tracks of six exemplary spot beams (15° field of view).

In one embodiment of this invention the antenna structure 70 is operated with a knowledge of the satellite 12 ephemeris data such that a relatively simple determination can be made as to which of the plurality of elements 76 and sub-structures 72, 74 to select at any time to provide the maximum gain to the receiver 68a. In operation, the elements 76 of one sub-structure 72, 74 are coupled to the receiver 68a at any given time, while the vertically pointing reference antenna element is always connected to the receiver 68a.

Figure 10:
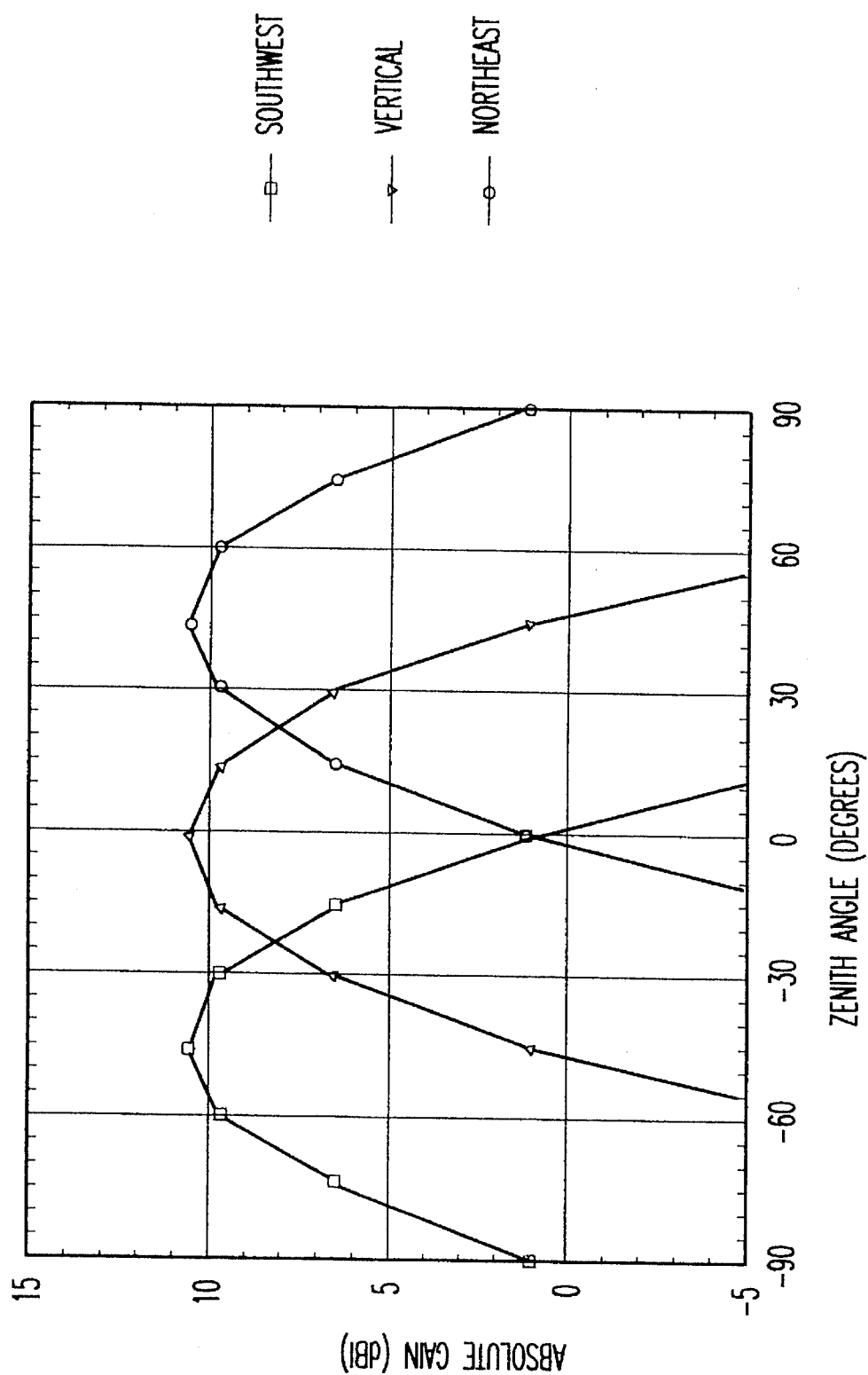
FIG. 10 is graph that plots absolute gain (dBi) versus zenith angle (degrees) for the fixed antenna system of this invention.

FIG. 10 shows the expected performance of the antenna structure 70 for a satellite 12 which is passing from, for example, southwest to northeast. The satellite 12 first encounters SW-facing antenna elements 76 and experiences a gain which varies from approximately 1 dBi at the horizon (−0° elevation angle) to approximately 11 dBi at 45° elevation angle. The gain then decreases down to approximately 8 dBi at about a 70° elevation angle, at which time the gain of the SW-facing antenna elements 76 match the gain of the vertical beam of the V antenna elements 76. When the elevation angle of the satellite 12 is in the range of 60°–80° the input to the receiver 68a of the user terminal 68 (FIG. 1) is switched from the SW-facing antenna elements 76 to the V-facing antenna elements. As the satellite 12 passes through the beam of the V antenna elements 76 the gain again increases to approximately 11 dBi, and then falls off back to approximately 8 dBi. At this point, the receiver 68a is switched from the V antenna elements to the NE-facing antenna elements 76. As the satellite 12 passes through the beam of the NE-facing antenna elements 76 the gain again increases to approximately 11 dBi and then falls back towards 1 dBi at 0° elevation angle before the satellite passes over the horizon.

Practical considerations, such as propagation losses, can limit the minimum usable satellite elevation angle to the range of approximately 10° to approximately 20°. Under this condition, the antenna structure 70 provides a minimum gain of approximately 7.5 dBi. This gain provides a great advantage in signal strength for a satellite-based communication system, and enables a reduction in satellite power consumption to be achieved.

Figure 8:
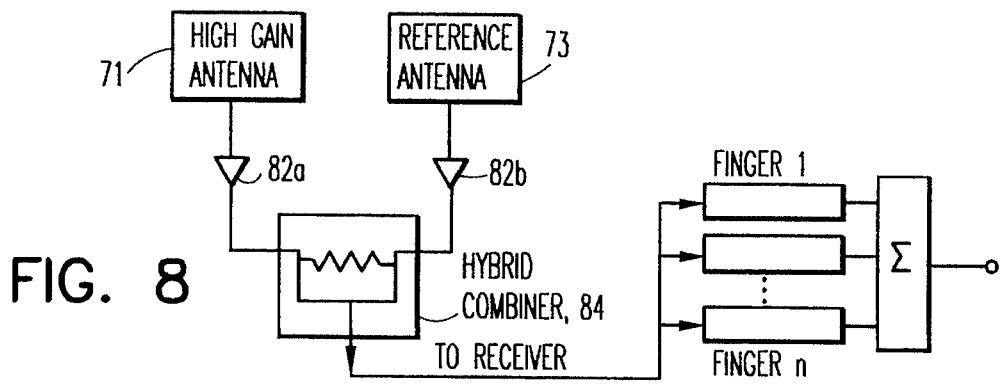
FIG. 8 is a block diagram of the antenna system of this invention.

A description of the multiple satellite communication feature is now provided. This description is made in the context of a receive function. It should be realized however that changing the Low Noise Amplifiers (LNAs) 82a and 82b in FIG. 8 to a power amplifiers, and also changing the direction of signal flow, makes this discussion apply equally as well to a transmit function.

The reference antenna 73 is combined with the high gain main antenna 71 through the use of a separate LNA 82b, which precedes a signal combiner 84, in order to avoid a 3 dB gain loss that typically occurs when antennas are combined directly. By example, the combiner 84 may be embodied as a well known Wilkinson hybrid combiner. The use of the separate LNA 82b thus maintains the sensitivity of the reference antenna 73. The receiver 68a referred to in FIG. 8 as receiving the output of the combiner 84 is preferably the multiple finger receiver that is capable of simultaneously receiving, separating, and demodulating multiple spread spectrum transmissions. One suitable and presently preferred multiple finger spread spectrum receiver is that described in the aforementioned U.S. Pat. No. 5,233,626 to Ames, which has been incorporated by reference herein in its entirety. It should be realized, however, that the use of this particular SS receiver is not a limitation upon the practice of this invention, and that other SS receivers having different architectures may be employed as well.

The reference antenna 73 receives one or more non-communication signals from the satellites 12. In that the reference antenna 73 is omnidirectional, by virtue of being vertically pointed, these received non-communication signals typically have a lower signal strength than the "in use" signal that is carrying the current communication, such as a voice communication. In the presently preferred embodiment of this invention the reference antenna 73 receives the aforementioned pilot signals that are transmitted from every satellite 12 that is in view of the antenna structure 70. The only practical limits as to the number of pilot signals that can be simultaneously received are the number of satellites 12 that are simultaneously visible to the reference antenna 73, and also the number of fingers or channels that the receiver 68a has available to lock on to the received pilot signals, it being remembered that at least one finger is required to receive and despread the current communication.

The presence of the synchronizing signals from other satellites 12 allows the system 10 to transition the receiver 68a from the "in use" satellite 12 to one of the others whose pilot is also being received. This is a handoff procedure, and is accomplished by switching the high gain antenna 71 from the "in use" satellite 12 to one of the others which is preferably increasing in elevation angle. The identity of the rising satellite can be determined from its ephemeris data, which is stored in or otherwise accessible to the user terminal 68.

It should be realized that the use of the pilot signal channel is not required, and that in some embodiments another channel that conveys a synchronizing signal can be employed.

Figure 9A:
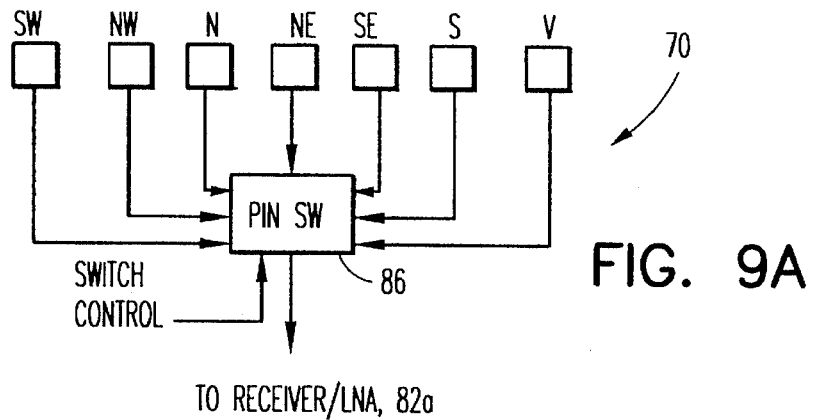
FIG. 9A is a block diagram of the high gain antenna portion of the block diagram of FIG. 8.

FIG. 9A is a block diagram of the antenna structure 70, and shows the outputs of the elements 76 from each of the seven sub-structures 72 and 74 being fed into a switch 86 that receives a switch control signal from a controller of the user terminal 68.

Figure 9B:
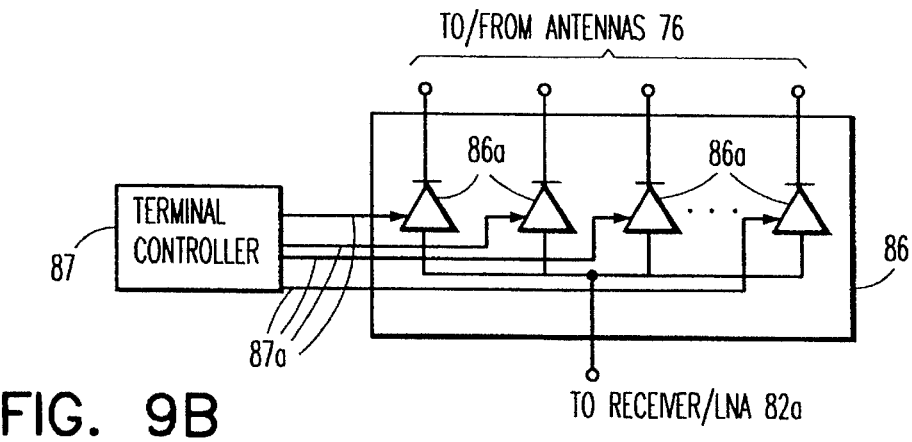
FIG. 9B is a schematic diagram of pin diode switch matrix of FIG. 9A.

By example, and as is shown in FIG. 9B, the switch 86 may include a plurality of PIN diode switches 86a of a type well known in the art. A user terminal switch controller 87 selects, when receiving a signal from only one satellite, one group of elements 76 from one of the sub-structures to be fed into the input of the LNA 82a (FIG. 8) by applying a suitable bias level to one of the PIN diodes 86a over one of the signal lines 87a.

The reception of the synchronizing channel (for example the pilot channel) from the second satellite 12, and the fact that the receiver 68a of the user terminal 68 has already locked onto and is tracking this synchronizing channel while receiving the communication signal from the first, in use, satellite 12, makes the transition from the first to the second satellite very smooth and invisible to the user.

After the transition (handoff) from the first to the second satellite takes place, the reference antenna 73 will most probably be receiving a pilot signal from a third satellite. As before, the receiver 68a is caused to allocate a finger to the newly received synchronizing signal and will eventually acquire and lock on to this signal, while receiving the communication from the second satellite. At some future time, the foregoing process will repeat so as to handoff the communication from the second satellite to the third satellite.

In principle, this process can continue indefinitely as "new" satellites become visible over the horizon, and as "old" satellites disappear beneath the horizon.

This multipath diversity reception technique provides a number of advantages in addition to the transparent handoff described above. By example, a first advantage occurs when the in-use satellite path experiences blocking or loss of signal for any reason. In this case the system 10 can quickly switch the high gain antenna 71 to a better quality signal from a different satellite whose pilot channel has already been acquired and which is currently being tracked.

A second advantage is that the total communication capacity of the satellite system is increased by virtue of the use of the satellite which is transmitting the strongest signal. That is, the use of the strongest signal reduces the overall power requirement from the satellite which is transmitting this signal, thereby making additional power available for other users.

Figure 13:
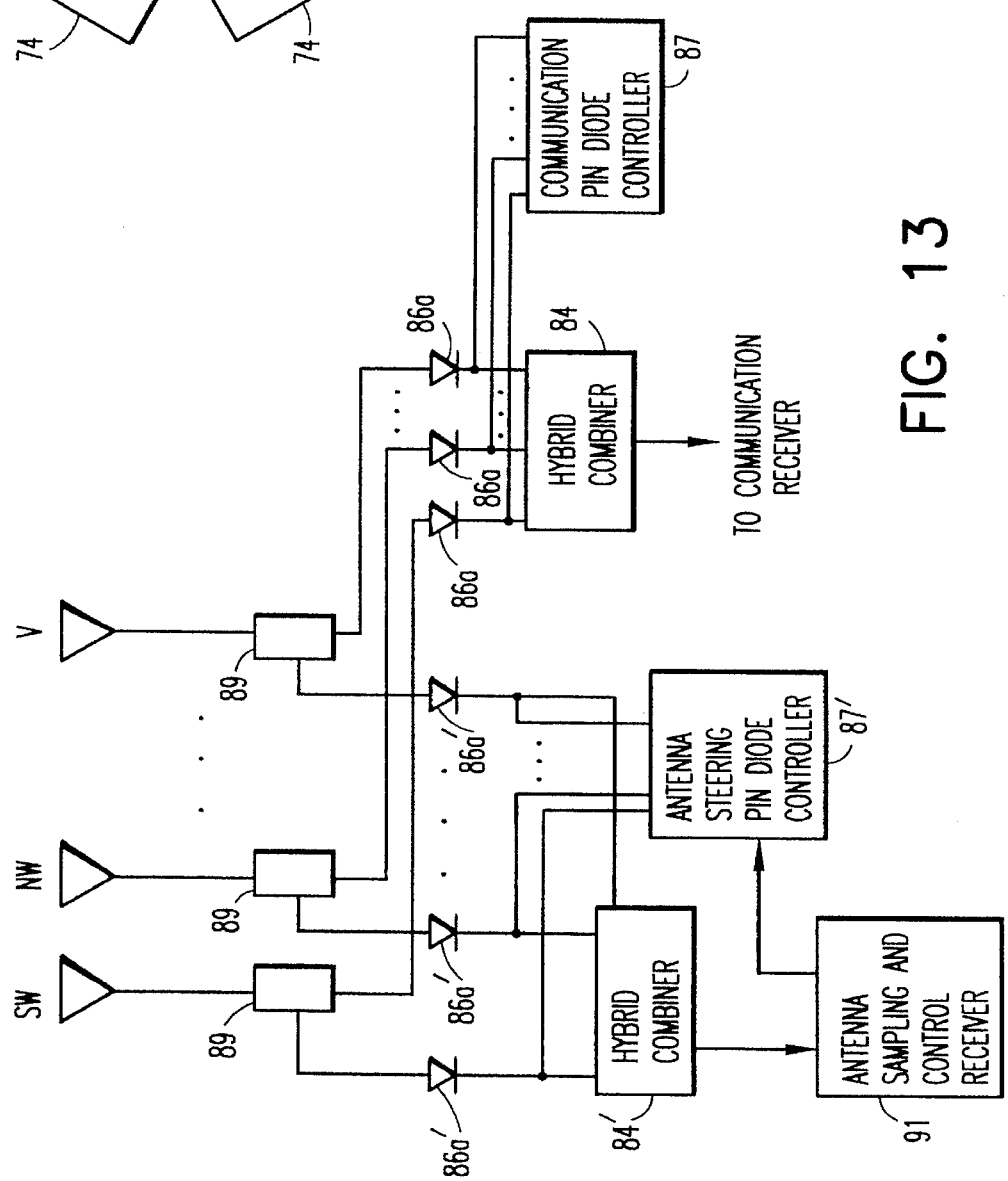
FIG. 13 is a block diagram of further embodiment of the invention wherein received signal strength is used for selecting and switching antennas.

Reference is now made to FIG. 13 for showing a further embodiment of this invention that does not require, or that is used in conjunction with, satellite ephemeris data. That is, in this embodiment the receive antenna system is employed to detect the relative signal strength of a satellite in various antenna segments by sampling the downlink signal strength on every segment prior to the signal reaching the PIN diode switch 86, and to then compare the relative strengths of the signals. Presumably, the signal will be strongest in the antenna currently being used. If, however, it is seen that the strength of the signal in another sub-structure (72, 74) is increasing so as to approach the strength of the sub-structure being used, it is indicated that the receiver can soon be switched to that antenna segment. Continuous monitoring of the received signals enables making the switch-over when the signals in the "current" antenna and the "new candidate" antenna are approximately equal. This embodiment employs a separate receiver from the receiver used for communication, but the separate receiver need only decode the SS-CDMA signal and give an output indication voltage that is correlated with the antenna segment being viewed at the time.

The sampling of the received signals from the antenna elements 76 disposed on the various sub-structures (72, 74) may be accomplished by use of a plurality of couplers 89 which feed the PIN diodes 86a and also a second set of PIN diodes (86a'). That is, it may be desirable to decouple the antenna selection system from the main antenna PIN diode switches 86a by using directional couplers 89. The PIN diodes 86a' converge on a second hybrid combiner 84' that is fed into an antenna sampling and control receiver 91. The PIN diodes 86a' are preferably scanned, via an antenna steering PIN diode controller 87' in a repetitive pattern such as "V-SW-NW-N-NE-SE-S", and the received signal strength is recorded at each antenna position and compared to a predetermined threshold value, such as a stored value and/or a value measured from the antenna element(s) 76 of another one of the sub-structures (72, 74). The result of the comparison is then employed to select another antenna element 76 or another sub-structure (72, 74), and is also used to determine an optimum time to switch the communication receiver to the antenna element(s) 76 of the other sub-structure (72, 74).

In addition to predicting the motion of the in-use satellite 12, this embodiment of the invention is also capable of detecting another (a further) satellite which is coming into view of the antenna structure 70. When the received signal strength of the further satellite is found to exceed the received signal strength from the satellite that is currently being used for communication, an indication is made that it is time to switch satellites. The tracking process described previously then repeats for the newly acquired satellite.

Furthermore, tracking and acquisition of satellites can be accomplished through the use of both predicted satellite elevation angle and azimuth, based on satellite ephemeris data, and also on the received signal strength as outlined above. As an example, satellite ephemeris data can be employed to select a sub-structure 74 to initially begin acquiring the satellite, while the received signal strength is subsequently employed to track the satellite's position as it proceeds in its orbit relative to the antenna structure 70.

Based on the foregoing description it can be realized that this invention provides a simple and low cost high gain antenna system that is capable of transmitting to and receiving from a satellite over a wide range of elevation angles. The antenna system requires no moving parts to track a moving satellite but instead employs an electronic switching arrangement to selectively couple antenna elements to an input of a receiver, or to an output of a transmitter. Furthermore, the antenna system enables a communication signal to be simultaneously received from a plurality of satellites and combined in the beforementioned diversity reception mode of operation. Also, a communication signal from one satellite can be received and tracked, while receiving non-communication synchronizing signals, such as pilot channels, from one or more other satellites.

It is anticipated that the antenna system and structure that has been described above may be modified in various ways. By example, more or less than four elements 76 can be included within each sub-structure 72 and 74. Also by example the reference antenna element 80 could be disposed on the sub-structure 72, as shown in FIG. 6 as the element 80', so long as an interference condition is not established with the antenna elements 76.

Furthermore, the (SW), (V) and (NE) tracking example given above has been made in the context of a satellite that passes directly over the vertical antenna sub-structure 72 (an "overhead" or high elevation angle pass). However, for a low elevation angle satellite pass only one or more of the sub-structures 74 may be required, such as the (S) and (SE) facing sub-structures 74. For another satellite pass it is possible to select, by example and depending upon the satellite's elevation angle and azimuth, antenna elements associated with the (SW), (V) , (NW) and (N) sub-structures 74, or antenna elements associated with the (SW), (NW), (N) and (NE) sub-structures 74.

Thus, while the invention has been particularly shown and described with respect to preferred embodiments thereof, it will be understood by those skilled in the art that changes in form and details may be made therein without departing from the scope and spirit of the invention.

What is claimed is:

1. An antenna system for coupling a terminal to a plurality of satellites of a constellation of low earth orbit satellites, each of the plurality of satellites being oriented, at any given time when in view of the terminal, at a particular elevation angle, comprising:

a first sub-structure having a major plane that is oriented at a first angle with respect to an axis that is perpendicular to the surface of the earth;

a plurality N of second sub-structures individual ones of which have a local major plane that is disposed at a second angle to said major plane of said first sub-structure, each of said plurality N of sub-structures having an outwardly pointing normal from said local major plane that is oriented at a third angle around said axis from an outwardly pointing normal of an adjacent one of said sub-structures, said outwardly pointing normal of each of said plurality N of sub-structures being disposed so as to point away from said axis; and at least one antenna element supported by said first sub-structure and by each of said plurality N of second sub-structures, wherein antenna elements of said first sub-structure and at least some of said plurality N of second sub-structures enable a spread spectrum communication between said terminal and at least one low earth orbit satellite over a range of elevation angles of said low earth orbit satellite.

2. An antenna system as set forth in claim 1 wherein said first angle is approximately 90°, and wherein said second angle is within a range of approximately 30° to approximately 60°.

3. An antenna system as set forth in claim 1 wherein said third angle is approximately 60°, and wherein N is equal to six.

4. An antenna system as set forth in claim 1 wherein said third angle is approximately 45°, and wherein N is equal to eight.

5. An antenna system as set forth in claim 1 wherein there are a plurality of said antenna elements that are supported by each of said sub-structures, and wherein individual ones of said plurality of antenna elements are spaced apart by a distance that is a function of a wavelength of interest.

6. An antenna system as set forth in claim 1 wherein there are a plurality of said antenna elements that are supported by each of said sub-structures, and wherein individual ones of said plurality of antenna elements are spaced apart by a distance within a range of approximately 0.5 λ to approximately 0.8 λ, wherein λ is a wavelength of interest.

7. An antenna system as set forth in claim 1 and further comprising at least one reference antenna element that is oriented at said first angle with respect to said axis that is perpendicular to the surface of the earth.

8. An antenna system as set forth in claim 1 wherein said first sub-structure has a generally planar, polygonal shape, and wherein individual ones of said second sub-structures each have an edge that is adjacent to one edge of said first sub-structure.

9. An antenna system as set forth in claim 1, and further comprising means for selectively outputting a signal received from at least one antenna element that is disposed upon one of said first sub-structure and said plurality N of second sub-structures.

10. An antenna system as set forth in claim 1, and further comprising means for selectively inputting a signal to at least one antenna element that is disposed upon one of said first sub-structure and said plurality N of second sub-structures.

11. An antenna system as set forth in claim 1, wherein said first angle is approximately 90°, and wherein individual ones of said plurality N of second sub-structures are oriented so as to generally face north (N), northeasat (NE), southeast (SE), south (S), southwest (SW) and northwest (NW), or subsets of these azimuthal orientations.

12. A communication system, comprising:

a constellation of low earth orbit satellites individual ones of which each comprise means for receiving at least one communication feeder link from at least one ground station and means for transmitting the received at least one communication feeder as a downlink transmission to a plurality of terrestrially located terminals; and at least one ground station including means for transmitting said at least one communication feeder link to at least one of said satellites and further comprising means for coupling said at least one feeder link to a terrestrially located communications system; wherein each of the plurality of satellites is oriented, at any given time when in view of one of said terminals, at a particular elevation angle;

characterized in that said terminal comprises, an antenna that is comprised of a first sub-structure having a major plane that is oriented at a first angle with respect to an axis that is perpendicular to the surface of the earth; a plurality N of second sub-structures individual ones of which have a local major plane that is disposed at a second angle to said major plane of said first sub-structure, each of said plurality N of sub-structures having an outwardly pointing normal from said local major plane that is oriented at a third angle around said axis from an outwardly pointing normal of an adjacent one of said sub-structures, said outwardly pointing normal of each of said plurality N of sub-structures being disposed so as to point away from said axis; and at least one antenna element supported by said first sub-structure and by each of said plurality N of second sub-structures, wherein antenna elements of said first sub-structure and at least some of said plurality N of second sub-structures enable a spread spectrum communication to occur between said terminal and at least one low earth orbit satellite over a range of elevation angles of said low earth orbit satellite.

13. A communication system as set forth in claim 12 wherein said antenna is further comprised of at least one reference antenna element that is oriented at said first angle with respect to said axis that is perpendicular to the surface of the earth, and wherein said terminal further includes a multiple-finger spread spectrum receiver having inputs coupled to said plurality of antenna elements and to said at least one reference antenna element, said receiver including means for allocating one of said fingers for receiving said spread spectrum communication from said at least one low earth orbit satellite, and for allocating at least one other one of said fingers for receiving a synchronizing signal that is received through said at least one reference antenna element from at least one other of said low earth orbit satellites.

14. A communication system as set forth in claim 12 and further comprising means for selecting as an output of said antenna an output of antenna elements associated with one of said first and second sub-structures, said selecting means being responsive to at least one of a predicted position of said at least one satellite and a received signal strength that is measured at said first and second sub-structures.

15. A communication system as set forth in claim 12 and further comprising means for selecting as an output of said antenna an output of antenna elements associated with one of said first and second sub-structures, said selecting means being responsive at least to a track direction and to an elevation angle of said at least one satellite.

16. A communication system as set forth in claim 12 and further comprising means for selecting, as an output of said antenna, an output of antenna elements associated with one of said first and second sub-structures so as to switch the reception of said spread spectrum communication from said at least one low earth orbit satellite to said at least one other one of said low earth orbit satellites.

17. A communication system as set forth in claim 12, wherein said first angle is approximately 90°, and wherein individual ones of said plurality N of second sub-structures are oriented so as to face generally north (N), northeast (NE), southeast (SE), south (S), southwest (SW) and northwest (NW), or subsets of these azimuthal orientations.

18. A communication system as set forth in claim 12, and further comprising a communication system control means that is bidirectionally coupled to said at least one ground station through a data link.

19. A communication system as set forth in claim 12, wherein said at least one ground station further comprises:

means for determining if said spread spectrum communication is to be operated in a diversity reception mode at the terminal and, if yes, for routing said spread spectrum communication simultaneously through a plurality of said low earth orbit satellites.

20. A method for operating a terminal to receive a communication from at least one satellite of a plurality of low earth orbit satellites, each of the plurality of satellites being oriented, at any given time when in view of the terminal, at a particular elevation angle and at a particular azimuth angle, comprising the steps of:

for a first range of elevation angles and azimuth angles, selecting a first portion of an antenna structure to receive the communication, the first portion being disposed at a first angle with respect to an axis that is normal to the surface of the earth;

for a second range of elevation angles and azimuth angles, selecting a second portion of the antenna structure to receive the communication, the second portion being disposed at a second angle with respect to the axis that is normal to the surface of the earth.

21. A method as set forth in claim 20 and further comprising a step of, for a third range of elevation angles and azimuth angles, selecting a third portion of the antenna structure to receive the communication, the third portion being disposed at the first angle with respect to the axis that is normal to the surface of the earth.

22. A method as set forth in claim 20 wherein the first angle is within a range of approximately 30° to approximately 60°, and wherein the second angle is either within the range of approximately 30° to approximately 60° or is approximately 90°.

23. A method as set forth in claim 20 and further comprising the simultaneously executed steps of receiving and tracking a synchronizing signal from at least one other satellite of the plurality of satellites.

24. A method as set forth in claim 23 wherein the received communication is a spread spectrum communication, and wherein the steps of receiving and tracking include a step of locking to a synchronizing channel that is transmitted by the at least one other satellite.

25. A method as set forth in claim 20 wherein the steps of selecting each employ satellite ephemeris data to predict a position of the at least one satellite.

26. A method as set forth in claim 20 wherein the steps of selecting each employ a magnitude of a signal that is received from the at least one satellite.

27. A method for operating a terminal to transmit a communication to at least one satellite of a plurality of low earth orbit satellites, each of the plurality of satellites being oriented, at any given time when in view of the terminal, at a particular elevation angle and at a particular azimuth angle, comprising the steps of:

for a first range of elevation angles and azimuth angles, selecting a first portion of an antenna structure to transmit the communication, the first portion being disposed at a first angle with respect to an axis that is normal to the surface of the earth; and for a second range of elevation angles and azimuth angles, selecting a second portion of the antenna structure to transmit the communication, the second portion being disposed at a second angle with respect to the axis that is normal to the surface of the earth.

28. A method as set forth in claim 27 and further comprising a step of, for a third range of elevation angles, selecting a third portion of the antenna structure to transmit the communication, the third portion being disposed at the first angle with respect to the axis that is normal to the surface of the earth.

29. A method as set forth in claim 27 wherein the first angle is within a range of approximately 30° to approximately 60°, and wherein the second angle is either within the range of approximately 30° to approximately 60° or is approximately 90°.

30. A method as set forth in claim 27 wherein the steps of selecting each employ satellite ephemeris data to predict a position of the at least one satellite.

31. A method as set forth in claim 27 wherein the steps of selecting each employ a magnitude of a signal that is received from the at least one satellite.

32. A method for operating a terminal to receive a communication from at least one satellite of a plurality of low earth orbit satellites, each of the plurality of satellites being oriented, at any given time when in view of the terminal, at a particular elevation angle and at a particular azimuth angle, comprising the steps of:

for a first predicted range of elevation angles and azimuth angles of the at least one satellite, selecting a first portion of an antenna structure to receive the communication, the first portion being disposed at a first angle with respect to an axis that is normal to the surface of the earth; and for a second predicted range of elevation angles and azimuth angles of the at least one satellite, selecting a second portion of the antenna structure to receive the communication, the second portion being disposed at a second angle with respect to the axis that is normal to the surface of the earth.

33. A method as set forth in claim 32 wherein the first angle is within a range of approximately 30° to approximately 60°, and wherein the second angle is either within the range of approximately 30° to approximately 60° or is approximately 90°.

34. A method for operating a terminal to receive a communication from at least one satellite of a plurality of low earth orbit satellites, each of the plurality of satellites being oriented, at any given time when in view of the terminal, at a particular elevation angle and at a particular azimuth angle, comprising the steps of:

measuring a signal strength of a signal received from the at least one satellite with at least one of a plurality of antennas individual ones of which are oriented to receive a satellite transmission from a satellite disposed within a range of elevation angles and azimuth angles, wherein certain ones of the ranges of elevation angles and azimuth angles overlap one another;

for a first range of elevation angles and azimuth angles of the at least one satellite wherein the measured signal strength exceeds a predetermined threshold value, selecting a first antenna to receive the communication, the first antenna being oriented at a first angle with respect to an axis that is normal to the surface of the earth; and for a second range of elevation angles and azimuth angles of the at least one satellite wherein the measured signal strength exceeds the predetermined threshold value, selecting a second antenna to receive the communication, the second antenna being oriented at a second angle with respect to the axis that is normal to the surface of the earth.

35. A method as set forth in claim 34 wherein the first angle is within a range of approximately 30° to approximately 60°, and wherein the second angle is either within the range of approximately 30° to approximately 60° or is approximately 90°.

* * * * *